(12) United States Patent
Hou et al.

(10) Patent No.: US 12,179,945 B2
(45) Date of Patent: Dec. 31, 2024

(54) THREE DEGREE OF FREEDOM HARDWARE IN LOOP SIMULATION SYSTEM AND ITS WORKING METHOD

(71) Applicant: HUNAN LANYUE Mechanical and Electrical Technology Co., Ltd, Changsha (CN)

(72) Inventors: Jianjun Hou, Changsha (CN); Jinbang Du, Changsha (CN); Jianmin Wang, Changsha (CN); Wugang Tian, Changsha (CN)

(73) Assignee: HUNAN LANYUE Mechanical and Electrical Technology Co., Ltd, Changsha (CN)

( * ) Notice: Subject to any disclaimer, the term of this patent is extended or adjusted under 35 U.S.C. 154(b) by 0 days.

(21) Appl. No.: 18/433,440

(22) Filed: Feb. 6, 2024

(65) Prior Publication Data

US 2024/0262540 A1 Aug. 8, 2024

(30) Foreign Application Priority Data

Feb. 6, 2023 (CN) .......................... 202310068093.0

(51) Int. Cl.
*F16C 17/10* (2006.01)
*B64G 7/00* (2006.01)
*F16C 32/06* (2006.01)

(52) U.S. Cl.
CPC .............. *B64G 7/00* (2013.01); *F16C 17/105* (2013.01); *F16C 32/0603* (2013.01)

(58) Field of Classification Search
CPC ....... B64G 7/00; F16C 17/105; F16C 32/0603
See application file for complete search history.

(56) References Cited

U.S. PATENT DOCUMENTS

| 2016/0124437 A1 | 5/2016 | Chen et al. |
| 2016/0163218 A1 | 6/2016 | Chesi et al. |
| 2017/0044928 A1 | 2/2017 | Tan et al. |

FOREIGN PATENT DOCUMENTS

| CN | 103869833 A | 6/2014 |
| CN | 104932559 A | 9/2015 |

(Continued)

OTHER PUBLICATIONS

Chen Zhi-Ming, et al., Research on the Automatic Balance System of Three-Axis Air Bearing Test-Bed, Computer Simulation, 2022, pp. 218-222, vol. 39, Issue 4.

(Continued)

*Primary Examiner* — Eric S. McCall
*Assistant Examiner* — Timothy P Graves
(74) *Attorney, Agent, or Firm* — Bayramoglu Law Offices LLC

(57) ABSTRACT

A three degree of freedom hardware in loop simulation system and its working method are provided. A triaxial air-bearing turntable is installed on a support frame. An air bearing support seat provides high-pressure gas lubrication to make an air bearing hemisphere freely roll and rotate. An attitude control system is installed on a test platform, and the platform is placed on an adapter plate, which is placed above the hemisphere. A position limiting protection device has a position limiting ring, which is located below the adapter plate and surrounds the hemisphere. The movement of the ring prevents the platform from deviating beyond a set angle. An automatic leveling device is located below the side of the platform and a leveling device control box is installed on the platform.

4 Claims, 6 Drawing Sheets

(56) References Cited

FOREIGN PATENT DOCUMENTS

| CN | 105173129 | A | | 12/2015 | | |
|---|---|---|---|---|---|---|
| CN | 105185188 | A | | 12/2015 | | |
| CN | 105674010 | A | | 6/2016 | | |
| CN | 106354030 | A | | 1/2017 | | |
| CN | 211519904 | U | * | 9/2020 | ............... | B64G 7/00 |
| CN | 112327942 | A | | 2/2021 | | |
| CN | 112595457 | A | | 4/2021 | | |
| CN | 112985694 | A | | 6/2021 | | |
| CN | 114572430 | A | | 6/2022 | | |

OTHER PUBLICATIONS

Shi-Long Liu, et al., A Low-Cost Microgravity Simulating System for Motion Control Study of Space Robot, Proceeding of the IEEE International Conference on Robotics and Biomimetics (ROBIO), 2013, pp. 2082-2087.

\* cited by examiner

```
┌─────────────────────────────────────────────────────────────┐
│ installing and fixing an air bearing support seat on a support │
│        frame, and connecting an air supply source             │
└─────────────────────────────────────────────────────────────┘
                              ▼
┌─────────────────────────────────────────────────────────────┐
│      installing a position limiting protection device to     │
│                prevent toppling and falling                  │
└─────────────────────────────────────────────────────────────┘
                              ▼
┌─────────────────────────────────────────────────────────────┐
│  installing an air bearing hemisphere below the test platform by the │
│ adapter plate, and installing a leveling device and an attitude control │
│      system, rotating parts of the entire system are installed │
└─────────────────────────────────────────────────────────────┘
                              ▼
┌─────────────────────────────────────────────────────────────┐
│   starting the air supply source, air is blown out from the air bearing │
│ support seat, aligning an air bearing hemisphere with a groove of the │
│ air bearing support seat to install it, and the air bearing hemisphere, a │
│   test platform, a leveling device, and an attitude control system are │
│            suspended on the air bearing support seat         │
└─────────────────────────────────────────────────────────────┘
                              ▼
┌─────────────────────────────────────────────────────────────┐
│  after installation, completing preliminary leveling of the test platform, │
│        activating an automatic leveling device, after system leveling is │
│ completed, closing a leveling device control box, driving the test platform │
│   to roll, pitch, and rotate by controlling a reaction flywheel to rotate, │
│    achieving attitude control of the reaction flywheel and simulating its │
│                       operation in space                     │
└─────────────────────────────────────────────────────────────┘
                              ▼
┌─────────────────────────────────────────────────────────────┐
│    after a test is completed, stopping the reaction flywheel and closing a │
│   battery box, controlling a top rod to protrude upwards until the top rod │
│  presses against the test platform and move a certain distance to separate │
│    the air bearing hemisphere located below the test platform from the air │
│ bearing support seat, preventing it from direct contacting with a spherical │
│   surface of the air bearing hemisphere and causing damage when turning │
│                        off the air supply source             │
└─────────────────────────────────────────────────────────────┘
```

FIG. 5

THREE DEGREE OF FREEDOM HARDWARE IN LOOP SIMULATION SYSTEM AND ITS WORKING METHOD

CROSS-REFERENCE TO THE RELATED APPLICATIONS

This application is based upon and claims priority to Chinese patent application Ser. No. 202310068093.0, filed on Feb. 6, 2023, the entire contents of which are incorporated herein by reference.

TECHNICAL FIELD

The invention relates to ground semi physical simulation of spacecraft, in particular to a three degree of freedom hardware in loop simulation system and a method adopted by the three degree of freedom hardware in loop simulation system.

BACKGROUND

An attitude control subsystem mainly consists of attitude adjustment actuators (flywheels and magnetic torque converters), attitude sensors (sun sensors, star sensors, gyroscopes, magnetometers, etc.), and corresponding attitude processors. Position information of a current spacecraft is obtained by attitude sensors, and then an attitude adjustment actuator is controlled to move to a target position by a control processor. The attitude control subsystem is a key component to ensure in-orbit lifespan and mission effectiveness of the spacecraft. Prior to an in-orbit flight, sufficient ground testing and verification are crucial for success or failure of the entire mission. The working environment of the spacecraft is a zero gravity environment. In order to achieve a microgravity and low friction test environment on the ground, a hardware in loop simulation test platform for the spacecraft needs to be built on the ground to realize spatial motion with three degrees of freedom.

In a simulation progress, when a center of mass of a triaxial air-bearing turntable does not coincide with a center of an air bearing ball, gravity interference torque will be generated. In order to ensure an effectiveness of a ground full physics simulation test, it is necessary that a gravity interference torque of a triaxial air-bearing turntable meets requirements of a mission simulation test. Therefore, it is necessary to perform balance work of center of mass before an experiment to reduce a deviation between the center of mass of the triaxial air-bearing turntable and the center of the air bearing ball, thereby eliminating an influence of the gravity interference torque.

By searching literature and patents, a patent related to an adjustment of a center of mass of a triaxial air-bearing turntable is found, whose application number is CN202110156207.8, and title is Method and System for Balancing Center of Mass of Triaxial Air-bearing Turntable. It discloses a system for balancing a center of mass of a triaxial air-bearing turntable, comprising: a first balancing module, controlling a flywheel wheel by placing the triaxial air-bearing turntable in a horizontal state, and adjusting a balance in a horizontal direction according to an attitude measured by a first attitude measuring instrument; a second balancing module: tilting and biasing the triaxial air-bearing turntable by controlling the flywheel wheel, and adjusting a balance in a vertical direction according to an attitude measured by a second attitude measuring instrument. A balance method mainly relies on the flywheel for adjustment. However, an adjustment range of the flywheel is limited (It no longer outputs torque after reaching a rated speed, so it is unable to offset the interference torque), and repeated adjustment is required, which cannot be achieved in one go and is difficult to adjust quickly.

By searching literature and patents, a patent related to a hardware in loop simulation system of a triaxial air-bearing turntable is found, whose application number is CN202011418855.8, and title is Center of Mass of Triaxial Air-bearing Turntable Pre-adjustment Balance Device and its working method. It comprises an air bearing support piece, comprising a ball bearing; an air bearing ball suspended on a ball bearing, equipped with an instrument platform; a center of mass pre-adjustment balance mechanism, comprising: a position limiting device installed on an air bearing support, which restricts the instrument platform from further tilting when the instrument platform tilts; and a center of mass adjustment device installed on the instrument platform, which adjusts the center of mass position of the instrument platform by adjusting its own mass. The center of mass of triaxial air-bearing turntable pre-adjustment balance device uses a mass block to roughly adjust the center of mass, which cannot achieve precise leveling and meet experimental requirements.

SUMMARY

In order to overcome the defects of the prior art, the technical problem to be solved by the invention is to provide a three degree of freedom hardware in loop simulation system, which need not repeated adjustment and can achieve automatic leveling of a triaxial air-bearing turntable, with a wide adjustment range and fast speed.

The technical scheme of the invention is as follows.

The three degree of freedom hardware in loop simulation system, comprises a support frame, a triaxial air-bearing turntable, a position limiting protection device, a test platform (1), an adapter plate (2), an automatic leveling system, an attitude control system.

The triaxial air-bearing turntable is installed on the support frame. The triaxial air-bearing turntable comprises an air bearing support seat and an air bearing hemisphere (3). The air bearing support seat provides high-pressure gas lubrication to make the air bearing hemisphere freely roll and rotate in a ball socket of the air bearing support seat.

The attitude control system is installed on the test platform, and the test platform is placed on an adapter plate, which is placed above the air bearing hemisphere.

The position limiting protection device has a position limiting ring, which is located below the adapter plate and surrounds the air bearing hemisphere. the movement of the position limiting ring prevents the test platform from deviating beyond a set angle.

The automatic leveling system comprises an automatic leveling device (4) and a leveling device control box (5). The automatic leveling device is located below the side of the test platform and the leveling device control box is installed on the test platform. The automatic leveling device controls a rotation of a servo motor (42) by a motor controller (41) and drives a weight (44) on a slider (43) to move, achieving the purpose of leveling. At the same time, there is an inclinometer inside the leveling device control box to detect an angle of swing of the test platform.

In the invention the automatic leveling system comprises an automatic leveling device and a leveling device control box. The automatic leveling device is located below the side of the test platform and the leveling device control box is installed on the test platform. The automatic leveling device controls a rotation of a servo motor by a motor controller and drives a weight on a slider to move, achieving the purpose of leveling. At the same time, there is an inclinometer inside the leveling device control box to detect an angle of swing of the test platform. Therefore, it need not repeated adjustment and can achieve automatic leveling of a triaxial air-bearing turntable, with a wide adjustment range and fast speed.

A working method for the three degree of freedom hardware in loop simulation system is also provided, which, comprising the following steps:

(1) installing and fixing an air bearing support seat on a support frame, and connecting an air supply source, (2) installing a position limiting protection device to prevent toppling and falling, (3) installing an air bearing hemisphere below the test platform by the adapter plate, and installing a leveling device and an attitude control system, rotating parts of the entire system are installed, (4) starting the air supply source, air is blown out from the air bearing support seat, aligning an air bearing hemisphere with a groove of the air bearing support seat to install it, and the air bearing hemisphere, a test platform, a leveling device, and an attitude control system are suspended on the air bearing support seat, (5) after installation, completing preliminary leveling of the test platform, activating an automatic leveling device, after system leveling is completed, closing a leveling device control box, driving the test platform to roll, pitch, and rotate by controlling a reaction flywheel to rotate, achieving attitude control of the reaction flywheel and simulating its operation in space, and (6) after a test is completed, stopping the reaction flywheel and closing a battery box, controlling a top rod to protrude upwards until the top rod presses against the test platform and move a certain distance to separate the air bearing hemisphere located below the test platform from the air bearing support seat, preventing it from direct contacting with a spherical surface of the air bearing hemisphere and causing damage when turning off the air supply source.

A working method for the three degree of freedom hardware in loop simulation system is also provided, which, comprising the following steps:

(I) placing a device to undergo a triaxial test on a triaxial air-bearing turntable, setting all four sliders of four balance arms of an automatic leveling device to middle 0 scale positions of tracks, and adding a weight of 100 g to a slider respectively, (II) equally increasing the weights on the four balance arms until the triaxial air-bearing turntable enters a first state, namely a tumbler state, in which a center of mass of the triaxial air-bearing turntable is located below a sphere, and at this time, the triaxial air-bearing turntable can swing back and forth in a direction of a movement, then adjusting a counterweight on the triaxial air-bearing turntable, and adjusting a range of a displayed roll angle and pitch angle to within ±2°, reducing the weights on the four balance arms until the triaxial air-bearing turntable cannot keep the first state, (III) starting an automatic leveling system, and the system continuously adjusting positions of the four sliders on the balance arm according to a posture, until the range of the roll angle and pitch angle is adjusted to within ±0.05°, (IV) Simultaneously reducing the weights at the bottom of the four balance arms and at the four sliders, whose weight is reduced from large to small, and continuing with step (III), if ±0.05° cannot be achieved, adjusting the reduced weight until balance is completed, (V) if a final weight reduction is 1 g and automatic leveling cannot be completed, adding the reduced weight, continuing with step (III), (VI) setting to move the sliders up at a certain distance simultaneously, continuing with step (III), and (VII) continuing with step (VI) until one or more of the four sliders are in a limit position, then leveling is complete.

BRIEF DESCRIPTION OF THE DRAWINGS

FIG. 5 shows a flowchart of a working method for the three degree of freedom hardware in loop simulation system according to the present invention.

DETAILED DESCRIPTION OF THE EMBODIMENTS

Figure 1:
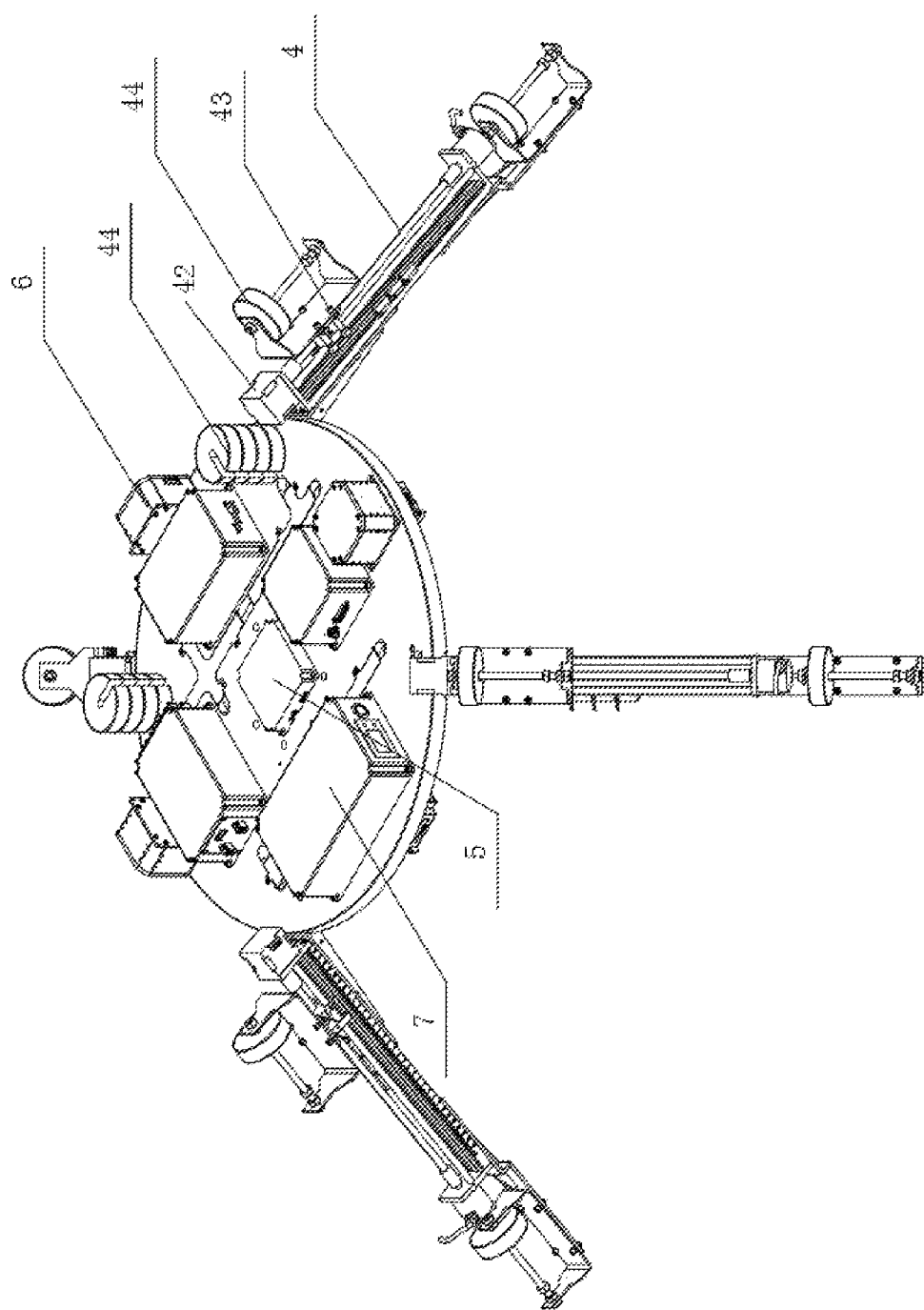
FIG. 1 is a schematic diagram showing the three degree of freedom hardware in loop simulation system according to the present invention.
Figure 2:
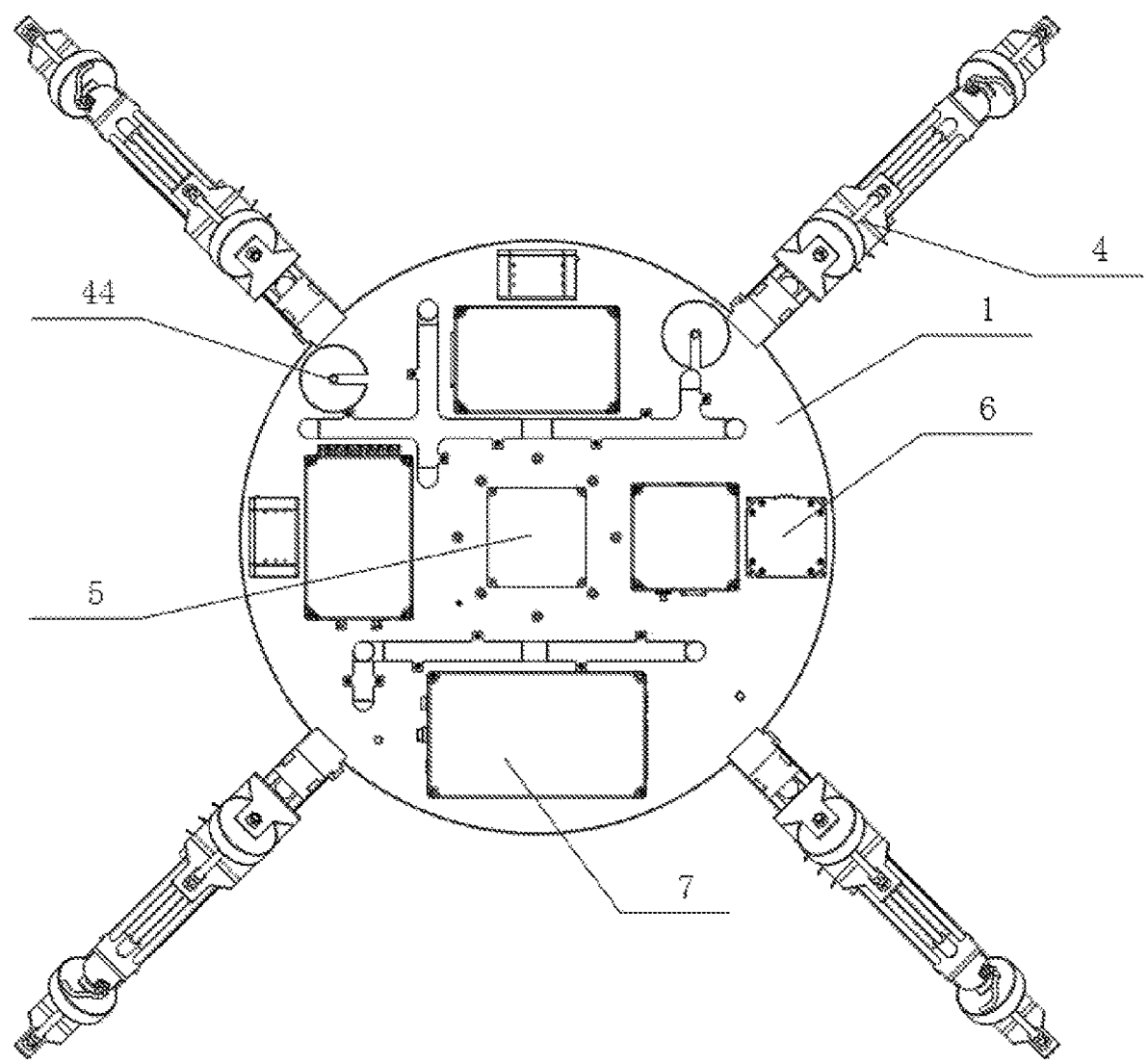
FIG. 2 shows a top view of FIG. 1.
Figure 3:
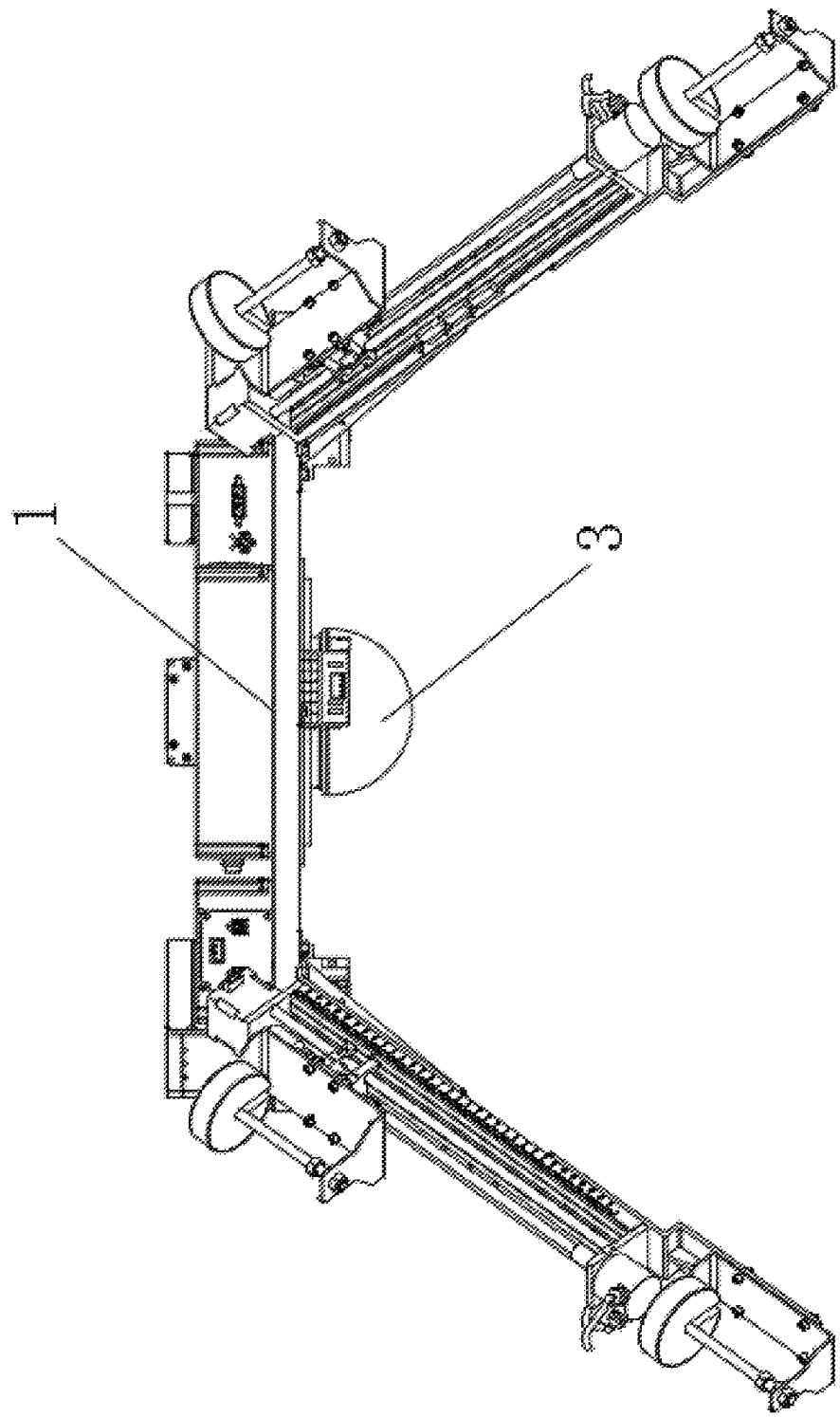
FIG. 3 shows a front view of FIG. 1.
Figure 4:
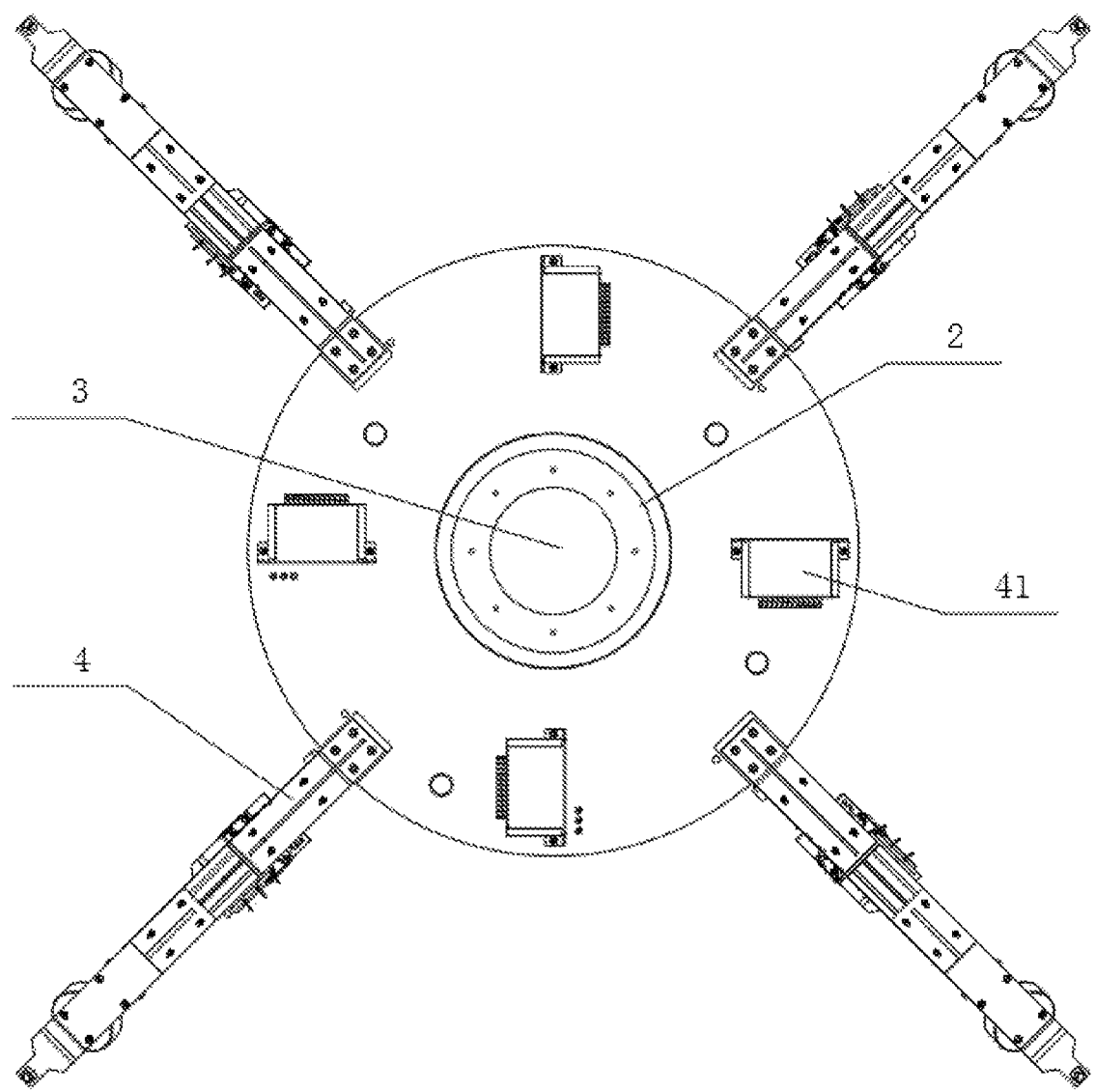
FIG. 4 shows a bottom view of FIG. 1.

As shown in FIGS. 1-4, this three degree of freedom hardware in loop simulation system, comprises a support frame, a triaxial air-bearing turntable, a position limiting protection device, a test platform 1, an adapter plate 2, an automatic leveling system, an attitude control system.

The triaxial air-bearing turntable is installed on the support frame. The triaxial air-bearing turntable comprises an air bearing support seat and an air bearing hemisphere 3. The air bearing support seat provides high-pressure gas lubrication to make the air bearing hemisphere freely roll and rotate in a ball socket of the air bearing support seat.

The attitude control system is installed on the test platform, and the test platform is placed on an adapter plate, which is placed above the air bearing hemisphere.

The position limiting protection device has a position limiting ring, which is located below the adapter plate and surrounds the air bearing hemisphere. the movement of the position limiting ring prevents the test platform from deviating beyond a set angle.

The automatic leveling system comprises an automatic leveling device 4 and a leveling device control box 5. The automatic leveling device is located below the side of the test platform and the leveling device control box is installed on the test platform. The automatic leveling device controls a rotation of a servo motor 42 by a motor controller 41 and drives a weight 44 on a slider 43 to move, achieving the purpose of leveling. At the same time, there is an inclinometer inside the leveling device control box to detect an angle of swing of the test platform.

In the invention the automatic leveling system comprises an automatic leveling device and a leveling device control box. The automatic leveling device is located below the side of the test platform and the leveling device control box is installed on the test platform. The automatic leveling device controls a rotation of a servo motor by a motor controller and drives a weight on a slider to move, achieving the purpose of leveling. At the same time, there is an inclinometer inside the leveling device control box to detect an angle of swing of the test platform. Therefore, it need not repeated adjustment and can achieve automatic leveling of a triaxial air-bearing turntable, with a wide adjustment range and fast speed.

Preferably, the support frame comprises supporting leg columns and a supporting flat plate, the supporting leg columns are installed below the supporting flat plate, and adjustable supporting leg columns are used to adjust height of the support frame. The air bearing support seat is placed on the supporting flat plate, and the height of the air bearing hemisphere can be adjusted by adjusting the height of the support frame, thereby adjusting the height of the test platform and attitude control system.

Preferably, the position limiting protection device is a mechanical position limiting protection device, the position limiting ring comprises three annular parts divided equally by three top rods, each annular part is fixed, and the top rods are controlled to protrude and retract to limit the movement of the test platform. When the test platform works normally, the top rods are controlled to retract. When the attitude control system rotates at a large angle, the top rods and the annular parts can avoid excessive deflection angle. When the test platform finishes working, the top rods are controlled to protrude to prevent the air bearing hemisphere from touching the inter surface of the air bearing support seat.

Preferably, the annular parts are fixed to the support plate by support rods. In this way, when used together with the top rods, even if the top rods rise, the annular parts are firmly fixed on the support plate to play a limiting role in case the top rods fail.

Preferably, the position limiting protection device is a position limiting bracket lifting automatically. The position limiting bracket lifting automatically is more convenient than a manual device such as top rods, and because there is no need for close operation, there is no possibility of accidentally touching the inner surface of the air bearing hemisphere or air bearing support seat.

Preferably, the position limiting protection device is a pneumatic position limiting protection device, the position limiting ring with a circular convex ring is connected with four lifting support rods below, each lifting rod is guided up and down and slides on a linear bearing, which is fixed on the support frame platform, wherein lower parts of two lifting support rods are connected to a bearing seat, the transmission shaft passes through a needle roller bearing to fix an inner ring of the bearing with a bearing stopper, the other two lifting support rods are suspended below, two sides of a cylinder support base plate of the device are connected and fixed on the support frame platform with cylinder base plate connection plates, the cylinder is fixed on the cylinder support base plate with two cylinder mounting brackets, one end of a cylinder extension rod is connected to a cam connecting rod, and two ends of the cam connecting rod are connected to the cam, and the cam is in a front high and back low shape, and two needle roller bearings connected by two lifting rods rolls on an irregular working surface of the cam.

Preferably, a silicone washer is installed in a concave position of the circular convex ring, which can make the test platform contact the limit ring with a soft silicone washer, reducing damage.

Preferably, a lower part of the cam contacts a cam slider, which thereby reduces the friction between the cam and the cylinder support plate, and extends the service life of the cam.

As shown in FIG. 5, a working method for the three degree of freedom hardware in loop simulation system is also provided, which, comprising the following steps:
(1) installing and fixing an air bearing support seat on a support frame, and connecting an air supply source,
(2) installing a position limiting protection device to prevent toppling and falling,
(3) installing an air bearing hemisphere below the test platform by the adapter plate, and installing a leveling device and an attitude control system, rotating parts of the entire system are installed,
(4) starting the air supply source, air is blown out from the air bearing support seat, aligning an air bearing hemisphere with a groove of the air bearing support seat to install it, and the air bearing hemisphere, a test platform, a leveling device, and an attitude control system are suspended on the air bearing support seat,
(5) after installation, completing preliminary leveling of the test platform, activating an automatic leveling device, after system leveling is completed, closing a leveling device control box, driving the test platform to roll, pitch, and rotate by controlling a reaction flywheel to rotate, achieving attitude control of the reaction flywheel and simulating its operation in space, and
(6) after a test is completed, stopping the reaction flywheel and closing a battery box, controlling a top rod to protrude upwards until the top rod presses against the test platform and move a certain distance to separate the air bearing hemisphere located below the test platform from the air bearing support seat, preventing it from direct contacting with a spherical surface of the air bearing hemisphere and causing damage when turning off the air supply source.

Figure 6:
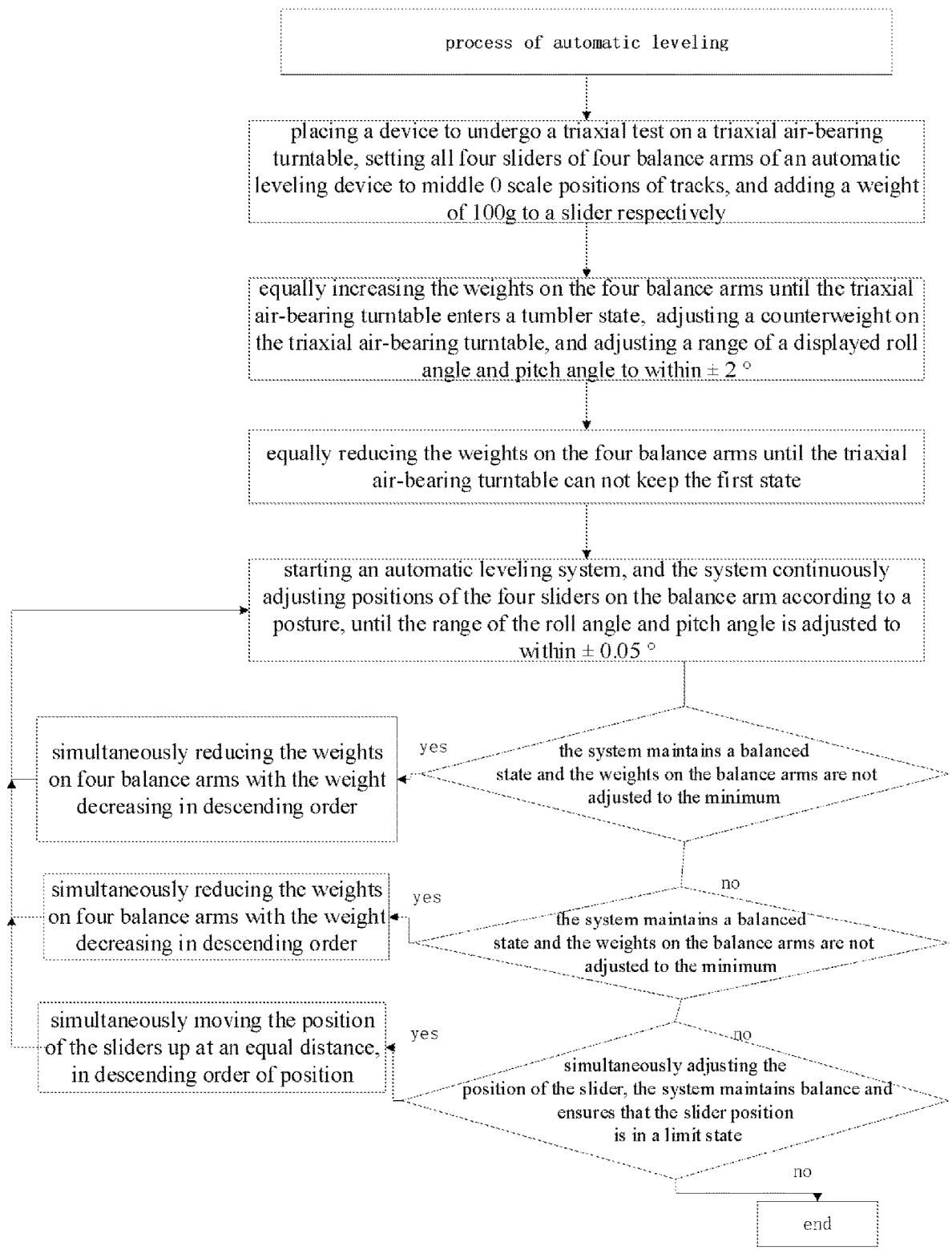
FIG. 6 shows a flowchart of another working method for the three degree of freedom hardware in loop simulation system according to the present invention.

As shown in FIG. 6, a working method for the three degree of freedom hardware in loop simulation system is also provided, which, comprising the following steps:
(I) placing a device to undergo a triaxial test on a triaxial air-bearing turntable, setting all four sliders of four balance arms of an automatic leveling device to middle 0 scale positions of tracks, and adding a weight of 100 g to a slider respectively,
(II) equally increasing the weights on the four balance arms until the triaxial air-bearing turntable enters a first state, namely a tumbler state, in which a center of mass of the triaxial air-bearing turntable is located below a sphere, and at this time, the triaxial air-bearing turntable can swing back and forth in a direction of a movement, then adjusting a counterweight on the triaxial air-bearing turntable, and adjusting a range of a displayed roll angle and pitch angle to within ±2°, reducing the weights on the four balance arms until the triaxial air-bearing turntable cannot keep the first state,
(III) starting an automatic leveling system, and the system continuously adjusting positions of the four sliders on the balance arm according to a posture, until the range of the roll angle and pitch angle is adjusted to within ±0.05°,
(IV) Simultaneously reducing the weights at the bottom of the four balance arms and at the four sliders, whose weight is reduced from large to small, and continuing with step (III), if ±0.05° cannot be achieved, adjusting the reduced weight until balance is completed, (V) if a final weight reduction is 1 g and automatic leveling cannot be completed, adding the reduced weight, continuing with step (III), (VI) setting to move the sliders up at a certain distance simultaneously, continuing with step (III), and (VII) continuing with step (VI) until one or more of the four sliders are in a limit position, then leveling is complete.

The above contents are only the preferable embodiments of the present invention, and do not limit the present invention in any manner. Any improvements, amendments and alternative changes made to the above embodiments according to the technical spirit of the present invention shall fall within the claimed scope of the present invention.

What is claimed is:

1. A three degree of freedom hardware in loop simulation system, comprising a support frame, a triaxial air-bearing turntable, a position limiting protection device, a test platform, an adapter plate, an automatic leveling system, and an attitude control system, the triaxial air-bearing turntable is installed on the support frame, the triaxial air-bearing turntable comprises an air bearing support seat and an air bearing hemisphere, the air bearing support seat provides high-pressure gas lubrication to make the air bearing hemisphere freely roll and rotate in a ball socket of the air bearing support seat, the attitude control system is installed on the test platform, and the test platform is placed on an adapter plate, the adapter plate is placed above the air bearing hemisphere, the position limiting protection device has a position limiting ring, the position limiting ring is located below the adapter plate and surrounds the air bearing hemisphere, a movement of the position limiting ring prevents the test platform from deviating beyond a set angle, and the automatic leveling system comprises an automatic leveling device and a leveling device control box, the automatic leveling device is located below a side of the test platform and the leveling device control box is installed on the test platform, the automatic leveling device controls a rotation of a servo motor by a motor controller and drives a weight on a slider to move, wherein a purpose of leveling is achieved, at the same time, there is an inclinometer inside the leveling device control box to detect an angle of swing of the test platform, wherein the support frame comprises supporting leg columns and a supporting flat plate, the supporting leg columns are installed below the supporting flat plate, and adjustable supporting leg columns are configured to adjust height of the support frame, the position limiting protection device is a pneumatic position limiting protection device, the position limiting ring with a circular convex ring is connected with four lifting support rods below, each of the four lifting support rods is guided up and down and slides on a linear bearing, the linear bearing is fixed on a support frame platform, wherein lower parts of first two lifting support rods are connected to a bearing seat, a transmission shaft passes through a needle roller bearing to fix an inner ring of the needle roller bearing with a bearing stopper, second two lifting support rods are suspended below, two sides of a cylinder support base plate of the position limiting protection device are connected and fixed on the support frame platform with cylinder base plate connection plates, a cylinder is fixed on the cylinder support base plate with two cylinder mounting brackets, one end of a cylinder extension rod is connected to a cam connecting rod, and two ends of the cam connecting rod are connected to a cam, and the cam is in a front high and back low shape, and two needle roller bearings connected by two lifting rods rolls on an irregular working surface of the cam.

2. The three degree of freedom hardware in loop simulation system according to claim 1, wherein a silicone washer is installed in a concave position of the circular convex ring.

3. The three degree of freedom hardware in loop simulation system according to claim 2, wherein a lower part of the cam contacts a cam slider.

4. A working method for the three degree of freedom hardware in loop simulation system according to claim 1 comprising the following steps:

I) placing a device to undergo a triaxial test on the triaxial air-bearing turntable, setting all four sliders of four balance arms of the automatic leveling device to middle 0 scale positions of tracks, and adding a weight of 100 g to the slider respectively, II) equally increasing the weights on the four balance arms until the triaxial air-bearing turntable enters a first state, namely a tumbler state where a center of mass of the triaxial air-bearing turntable is located below a sphere, and at this time, the triaxial air-bearing turntable is allowed to swing back and forth in a direction of a movement, then adjusting a counterweight on the triaxial air-bearing turntable, and adjusting a range of a displayed roll angle and pitch angle to within ±2°, reducing the weights on the four balance arms until the triaxial air-bearing turntable is not allowed to keep the first state, III) starting the automatic leveling system, and the automatic leveling system continuously adjusting positions of the four sliders on the balance arm according to a posture, until the range of the roll angle and pitch angle is adjusted to within ±0.05°, IV) Simultaneously reducing the weights at a bottom of the four balance arms and at the four sliders, weight of the weights is reduced from large to small, and continuing with step III), if ±0.05° is not allowed to be achieved, adjusting the reduced weight until balance is completed, V) if a final weight reduction is 1 g and automatic leveling is not allowed to be completed, adding the reduced weight, continuing with step III), VI) setting to move the sliders up at a predetermined distance simultaneously, continuing with step III), and VII) continuing with step VI) until at least one of the four sliders are in a limit position, and leveling is complete.

\* \* \* \* \*